United States Patent
Okawa

Patent Number: 5,118,777
Date of Patent: Jun. 2, 1992

[54] POLYDIMETHYLSILOXANE TERMINATED AT ONE END BY A BRANCHED AMINOALKYL GROUP AND PREPARATION THEREOF

[75] Inventor: Tadashi Okawa, Chiba, Japan

[73] Assignee: Toray Dow Corning Silicone, Tokyo, Japan

[21] Appl. No.: 612,153

[22] Filed: Nov. 13, 1990

[30] Foreign Application Priority Data

Nov. 29, 1989 [JP] Japan ................ 1-309952

[51] Int. Cl.⁵ ........................... C08G 77/04
[52] U.S. Cl. ........................ 528/34; 528/38; 556/426; 556/467
[58] Field of Search ......... 528/34, 38; 556/425, 556/467

[56] References Cited

U.S. PATENT DOCUMENTS

4,661,577  4/1987  Lane ....................... 528/34
5,064,544  11/1991  Lin et al. ................ 556/425

Primary Examiner—Melvyn I. Marquis
Attorney, Agent, or Firm—Alexander Weitz

[57] ABSTRACT

A polydimethylsiloxane compound terminated at one end by a branched aminoalkyl group, having the average formula

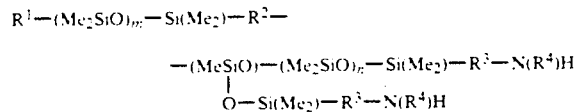

wherein $R^1$ and $R^4$ are monovalent hydrocarbon groups having 1 to 20 carbon atoms, $R^2$ and $R^3$ are alkylene groups having at least two carbon atoms, Me is a methyl radical, m is an integer between 6 and 1,000 and n is an integer between zero and 6, is disclosed. The polydimethylsiloxane of the invention can be easily prepared by the method described and imparts improved surface properties, such as water repellency and slipperiness, to organic resins modified therewith.

8 Claims, No Drawings

POLYDIMETHYLSILOXANE TERMINATED AT ONE END BY A BRANCHED AMINOALKYL GROUP AND PREPARATION THEREOF

FIELD OF THE INVENTION

The present invention relates to amine functional organopolysiloxane. More particularly, this invention relates to a novel polydimethylsiloxane compound terminated at one end by a branched aminoalkyl group and to a method for its preparation.

BACKGROUND OF THE INVENTION

Various aminoalkyl-terminated organopolysiloxanes are already known, for which typical examples are as follows, wherein Me hereinafter denotes a methyl radical.

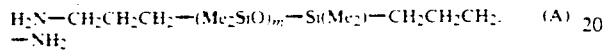

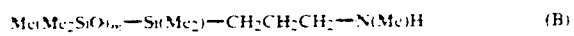

These organopolysiloxanes are used to prepare silicone-modified organic resins by reaction with the monomer of organic resins such as polyimide resins, polyamide resins, polyurea resins, epoxy resins, and so forth. This is very useful for conferring upon these organic resins the high oxygen permeability and surface slipperiness, for example, which are characteristic of silicone compounds.

However, the above-described polydimethylsiloxane which is terminated by aminoalkyl at both ends (i.e., formula A) does not impart an entirely satisfactory surface-improving effect with regard to organic resins. The reason for this is thought to be that the siloxane chain is immobilized at both ends due to the reaction of the amino group present at each end in this type of siloxane compound.

With regard to the polydimethylsiloxane terminated by the amino group at only one end (i.e., formula B), a surface-improving activity can certainly be contemplated since only one end reacts and the polysiloxane chain is therefore immobilized at only one end. However, this compound is monofunctional, and, because it functions as a reaction terminator, it is unsuitable for producing an organic resin in which the polydimethylsiloxane is grafted in a comb-like configuration.

While it may be though that the use of an polydimethylsiloxane having a two amino groups at one end would be an effective strategy for solving these problems, such siloxane compounds, and a method for their preparation, are heretofore unknown.

SUMMARY OF THE INVENTION

The present invention takes as its object the introduction of a novel polydimethylsiloxane compound which is terminated at one end by a branched aminoalkyl group (i.e., a branched aminoalkyl-monoterminated polydimethylsiloxane compound). The present invention therefore relates to a polydimethylsiloxane represented by the following general formula

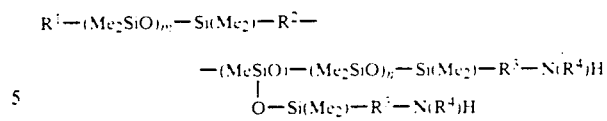

wherein $R^1$ and $R^4$ are monovalent hydrocarbon groups having 1 to 20 carbon atoms. $R^2$ and $R^3$ are alkylene groups having at least two carbon atoms. Me is a methyl radical. m is an integer between 6 and 1,000 and n is an integer between zero and 6.

The invention further relates to a method of preparing the above polydimethylsiloxane from the corresponding silanol functional polydimethylsiloxane and a cyclic silazane having the formula

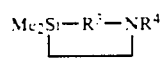

DETAILED DESCRIPTION OF THE INVENTION

The present invention proposes a branched aminoalkyl-monoterminated polydimethylsiloxane compound as represented by the following general formula.

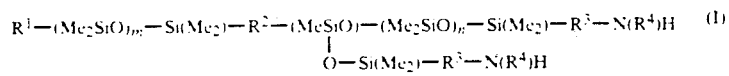

In formula (I), $R^1$ and $R^4$ are monovalent hydrocarbon groups which have 1 to 20 carbon atoms. $R^2$ and $R^3$ are alkylene groups which have at least 2 carbon atoms. m is an integer having a value of 6 to about 1,000 and n is an integer having a value of zero to 6.

To explain this in greater detail, the groups $R^1$ and $R^4$ in the branched aminoalkyl-monoterminated polydimethylsiloxane compound with general formula (I) comprise monovalent hydrocarbon groups such as alkyl groups, for example, methyl, ethyl, propyl, butyl, etc., and aryl groups, for example, phenyl, etc. The groups $R^2$ and $R^3$ comprise alkylene groups which have at least 2 carbon atoms, such as ethylene, propylene, and butylene.

The polydimethylsiloxane of formula (I) can be prepared from a polydimethylsiloxane compound which is terminated at one end by a branched silanol group, as represented by the following general formula

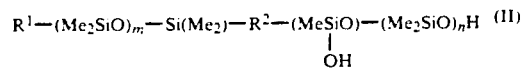

In formula (II), $R^1$, $R^2$, m and n have their respective previously defined meanings. The silanol functional polydimethylsiloxane (II) is reacted with a cyclic silazane having the following general formula.

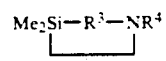 (III)

wherein $R^3$ and $R^4$ have their respective previously defined meanings. This cyclic silazane (III) can be obtained, for example, by the reaction of 3-chloro-2-methylpropyldimethylchlorosilane and methylamine according to the method in U.S. Pat. No. 3,146,250, hereby incorporated by reference.

The reaction between the cyclic silazane (III) and the silanolfunctional polydimethylsiloxane (II) is generally carried out without the use of a solvent. This reaction may also be conducted, as desired, using an aprotic organic solvent. Suitable solvents for this purpose include aromatic hydrocarbons, such as benzene, toluene and xylene; aliphatichydrocarbons, such as octane; chlorinated hydrocarbons, such as carbon tetrachloride and trichloroethane; ketones, such as methyl ethyl ketone and methyl isobutyl ketone; ethers, such as tetrahydrofuran and dibutyl ether; and esters, such as ethyl acetate and butyl acetate. The reaction temperature is generally zero to 200 degrees Centigrade and preferably within the range of zero to 120 degrees Centigrade.

The proportion between the above two reactants may be selected assuitable from a broad range in correspondence to the target branched aminoalkyl-monoterminated polydimethylsiloxane compound with general formula (I). However, as a general matter, the cyclic silazane (III) should be used at about a 5 to 20 mole percent excess over equivalency, based on the equivalents of silanol groups in the silanol-terminated polydimethylsiloxane (II). The surplus cyclic silazane should then be removed by distillation in vacuo after completion of the reaction.

The branched aminoalkyl-monoterminated polydimethylsiloxane of the present invention is useful as a modifier or property improver for organic resins. It is particularly suitable as a surface modifier for such resins. Furthermore, since this polydimethylsiloxane contains a branched aminoalkylgroup distribution at one molecular-chain end, the other end of the siloxane is not immobilized or fixed. Rather, the latter end occurs in a free state in a graft copolymer obtained from the reaction of the instant polydimethylsiloxane (I) with organic resin monomers possessing a functional group, such as the carboxyl group, isocyanate group, epoxy group, inter alia. One can therefore look forward to silicone-modified organic resins with remarkably improved surface properties, such as water repellency and slipperiness, among others.

EXAMPLES

The following examples are presented to further illustrate the compositions and method of this invention, but are not to be construed as limiting the invention, which is delineated in the appended claims. All parts and percentages in the examples are on a weight basis, unless indicated to the contrary. In the examples, n-Bu=normal-butyl, Me=methyl and Vi=vinyl.

REFERENCE EXAMPLE 1

To 120 parts of a polysiloxane having the general formula n-Bu—(Me$_2$SiO)$_m$—Si(Me$_2$)H in which m was about 24 and the silicon-bonded hydrogen atom content was 0.0536 percent, there was added a 1% tetrahydrofuran solution of chloroplatinic acid to provide a chloroplatinic acid concentration of 0.0020% in the overall reaction mixture. This mixture was heated to 60 degrees Centigrade, and MeViSiCl$_2$ was slowly dripped in. The reaction temperature rose to 73 degrees Centigrade, and a reaction was then run for approximately 3 hours at 70 to 80 degrees Centigrade. After it had been confirmed by infrared spectral analysis that the absorption assigned to the SiH group had disappeared, the low boilers were removed by distillation in vacuo.

One hundred and twenty eight parts of a polydimethylsiloxane having the following formula was obtained.

n-Bu—(Me$_2$SiO)$_m$—Si(Me$_2$)—CH$_2$CH$_2$—Si(Me)Cl$_2$

Then, a solution of 200 parts of diethyl ether and the 128 parts of the above polydimethylsiloxane was dripped (with vigorous stirring) into a 1 liter flask containing 250 parts water, 250 parts ice, 16 parts sodium bicarbonate and 300 parts diethyl ether, while cooling with an ice/salt mixture so the temperature in the flask did not exceed zero degrees Centigrade. The ether layer was recovered after the reaction, thoroughly washed with water, and then dried overnight over sodium sulfate. The ether was subsequently removed by distillation in vacuo and 124 parts of the following silanol-terminated polydimethylsiloxane was obtained.

n—Bu—(Me$_2$SiO)$_m$—Si(Me$_2$)—CH$_2$CH$_2$—SiMe(OH)$_2$

REFERENCE EXAMPLE 2

A polydimethylsiloxane having the formula n-Bu(Me$_2$SiO)$_{\overline{m}}$Si(Me$_2$)—CH$_2$CH$_2$)MeSiO)$_{\overline{n}}$Me$_2$SiO)$_{\overline{x}}$Si(Me$_2$)Cl
|
Cl was obtained by the same method as in Reference Example 1, but using 28 parts of the following compound MeViSiO—(Me$_2$SiO)$_2$—Si(Me$_2$)Cl
|
Cl in place of the MeViSiCl$_2$ used in Reference Example 1.

This polydimethylsiloxane was hydrolyzed as in Reference Example 1 to produce the following silanol-terminated polydimethylsiloxane.

n-Bu(Me$_2$SiO)$_{\overline{m}}$Si(Me$_2$)CH$_2$CH$_2$)MeSiO)$_{\overline{n}}$Me$_2$SiO)$_{\overline{x}}$Si(Me$_2$)OH
|
OH

EXAMPLE 1

The silanol-terminated polydimethylsiloxane prepared in Reference Example 1 (123.6 parts) and a cyclic silazane (21.3 parts) having the formula MeN — CH$_2$CH(Me)CH$_2$ — Si(Me)$_2$
|_____| were mixed at room temperature in a flask, and an exothermic reaction occurred immediately. After continuing to stir for an additional four hours at room temperature, the low boilers were distilled off in vacuo and 140.8 parts of a colorless, transparent liquid was obtained. The proton-NMR spectrum and infrared spectrum of this compound were measured, and it was confirmed to be the aminoalkyl group terminated polydimethylsiloxane compound reported below.

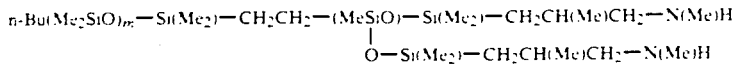

The viscosity of this polysiloxane was 32.7 centistokes at 25 degrees Centigrade. This polysiloxane had an amino group content (i.e., —NHMe weight content) of 2.6 weight % by titration, which was in complete agreement with the theoretical value of 2.6 weight %.

EXAMPLE 2

Thirty parts of the silanol-terminated polydimethylsiloxane prepared in Reference Example 2 and 4.85 parts the cyclic silazane having the formula

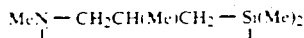

were mixed at room temperature in a flask, and an exothermic reaction occurred immediately. After continuing to stir for an additional four hours at room temperature, the low boilers were distilled off in vacuo and 33.7 parts of a colorless, transparent liquid was obtained. The proton-NMR spectrum and infrared spectrum of this compound were measured, and it was confirmed to be the aminoalkyl group terminated polydimethylsiloxane compound reported below.

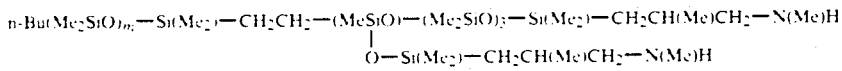

This polysiloxane had an amino group content (—NHMe weight content) of 2.4 weight %, which was in complete agreement with the theoretical value of 2.4 weight %.

I claim:

1. A polydimethylsiloxane terminated at one end by a branched aminoalkyl group, as represented by the following average formulas

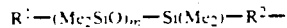

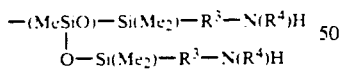

or

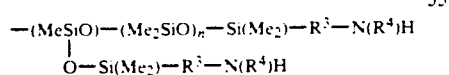

wherein $R^1$ and $R^4$ are monovalent hydrocarbon groups having 1 to 20 carbon atoms, $R^2$ and $R^3$ are alkylene groups having at least two carbon atoms, Me is a methyl radical, m is an integer between 6 and 1,000 and n is an integer between 1 and 6.

2. The composition according to claim 1, wherein $R^1$ and $R^4$ are independently selected from the group consisting of alkyl radicals having 1 to 4 carbon atoms and a phenyl radical.

3. The composition according to claim 2, wherein $R^2$ and $R^3$ are independently selected from the group consisting of ethylene, propylene and butylene groups.

4. The composition according to claim 3, wherein $R^4$ is a methyl radical.

5. A method for the preparation of a polydimethylsiloxane terminated at one end by a branched aminoalkyl group, as represented by the following average formulas

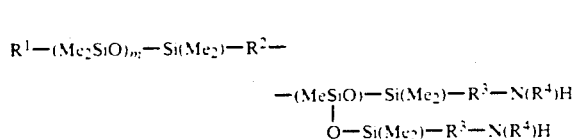

or

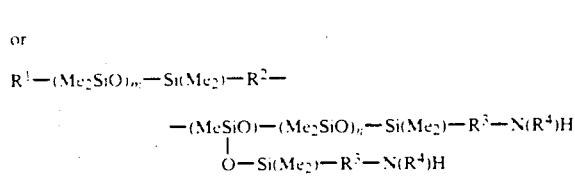

wherein $R^1$ and $R^4$ are monovalent hydrocarbon groups having 1 to 20 carbon atoms, $R^2$ and $R^3$ are alkylene groups having at least two carbon atoms, Me is a methyl radical, m is an integer between 6 and 1,000 and n is an integer between 1 and 6, comprising:

reacting a polydimethylsiloxane terminated at one end by a branched silanol group, as represented by the following average formula

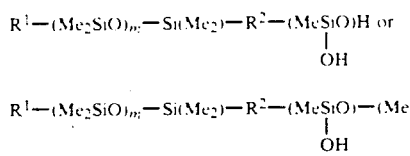

wherein $R^1$, $R^2$, Me, m and n have their above defined meanings, with a cyclic silazane represented by the following general formula

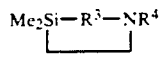

wherein $R^4$, Me and $R^3$ have their above defined meanings.

6. The method according to claim 5, wherein $R^1$ and $R^4$ are independently selected from the group consisting of alkyl radicals having 1 to 4 carbon atoms and a phenyl radical.

7. The method according to claim 6, wherein $R^2$ and $R^3$ are independently selected from the group consisting of ethylene, propylene and butylene groups.

8. The method according to claim 7, wherein $R^4$ is a methyl radical.

* * * * *